(12) United States Patent
Bereiter et al.

(10) Patent No.: US 6,357,017 B1
(45) Date of Patent: Mar. 12, 2002

(54) METHOD, SYSTEM AND COMPUTER PROGRAM PRODUCT FOR ITERATIVE DISTRIBUTED PROBLEM SOLVING

(75) Inventors: Thomas William Bereiter; Brian Jay Vetter, both of Austin, TX (US)

(73) Assignee: Motive Communications, Inc., Austin, TX (US)

( * ) Notice: Subject to any disclaimer, the term of this patent is extended or adjusted under 35 U.S.C. 154(b) by 0 days.

(21) Appl. No.: 09/663,212

(22) Filed: Sep. 15, 2000

Related U.S. Application Data

(63) Continuation of application No. 09/073,464, filed on May 6, 1998, now Pat. No. 6,145,096.

(51) Int. Cl.[7] ................................................ G06F 11/00
(52) U.S. Cl. ........................................ 714/27; 714/25
(58) Field of Search .............................. 714/25, 26, 27

(56) References Cited

U.S. PATENT DOCUMENTS

| | | | | |
|---|---|---|---|---|
| 5,107,500 A | * | 4/1992 | Wakamoto | 714/26 |
| 5,918,004 A | * | 6/1999 | Anderson | 714/38 |
| 5,944,839 A | * | 8/1999 | Isenberg | 714/26 |
| 5,983,364 A | * | 11/1999 | Bortcosh | 714/25 |
| 6,145,096 A | * | 11/2000 | Bereiter | 714/25 |
| 6,260,048 B1 | * | 7/2001 | Carpenter | 707/104 |
| 6,298,457 B1 | * | 10/2001 | Rachlin | 714/49 |

OTHER PUBLICATIONS

SystemWizard™ Webpages, data 1997–1998, as provided by Applicant in US Patent No. 6,145,096.*
Replicase Inc., Self–Healing System 1.0, 1998, 1–10.
Full Circle Software, Inc., Talkback Whitepaper, Jul. 1998, 1–7.
Cybermedia, First Aid, Oct. 1998, 1–6.
Aveo, The Attune System, Oct. 1998, 1–6.
SystemSoft Corporation, System Wizard–The End–To–End Solution, 1997–1998, 10 pages.

* cited by examiner

*Primary Examiner*—Robert Beausoleil
*Assistant Examiner*—Bryce P. Bonzo
(74) *Attorney, Agent, or Firm*—Skjerven Morrill MacPherson LLP

(57) ABSTRACT

A method, system and computer program product for automated technical support in a computer network having a client machine and at least one server. The method begins by selecting a diagnostic map useful in gathering diagnostic data for evaluating a given technical problem requiring diagnosis and correction. The diagnostic map encapsulates a set of one or more methods that, upon execution, explore the client machine and gather data. The diagnostic map is then executed by a diagnostic engine to generate a data set indicative of a current operating state of the client machine. This data set is forwarded from the client machine to the server for analysis. Based on the analysis performed at the server node, the data gathering process is repeated at the client machine, iteratively, until given information is available to a user of the client machine to correct the given technical problem.

16 Claims, 4 Drawing Sheets

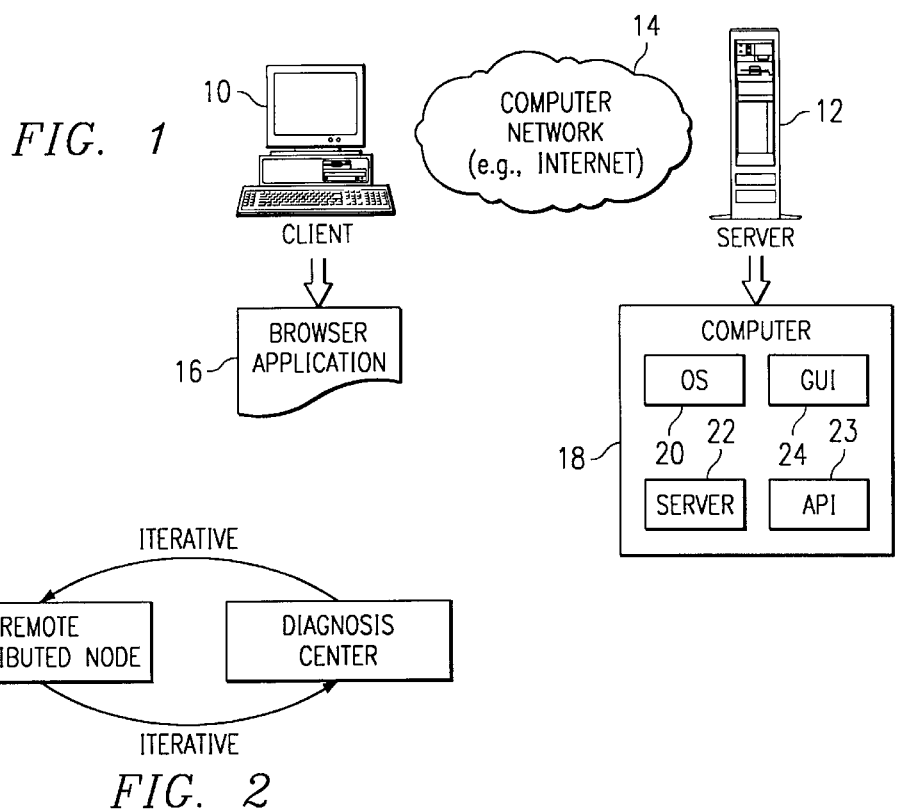
FIG. 1
FIG. 2
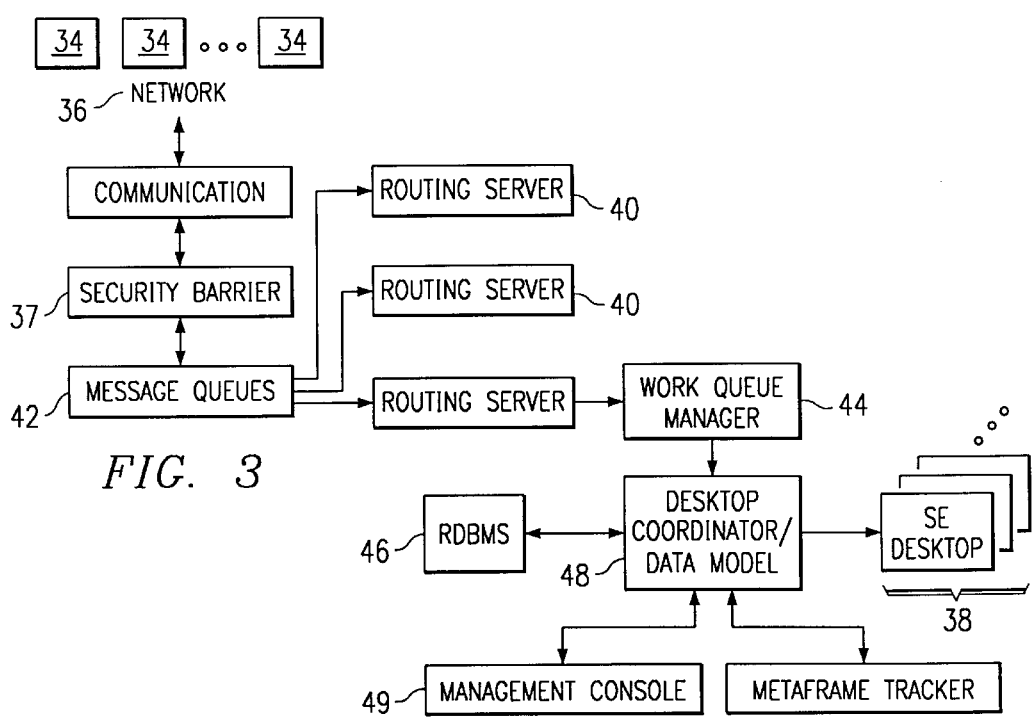
FIG. 3

```
                                        motive.mf
<?XML VERSION="1.0" RMD="NONE"?>
<SUBFRAME>
        <metaframeID>123</>
        <metaframeType>911</>               FIG. 6A
        <problemType>911</>
        <subFrameID>0</>
        <problemSummary>test</>
        <product>C:\Program Files\Motive\RAgent.exe</>
        <severity>Serious</>
        <mapID>nt40.map</>
        <collectionDate>February 5, 1998 5:13:38 AM PST</>
        <contact>
                <contactID>:   @Motive Software.com</>
                <firstName>   .</>
                <lastname> </>
                <middleInitial></>
                <jobTitle></>
                <street1></>
                <city></>
                <state></>
                <postalcode></>
                <country>USA</>
                <companyName>Motive Software</>
                <officePhone></>
                <emailAddress>     @Motive Software.com</>
        </>
        <host>
                <hostID>         ;11934</>
                <processor>Intel Pentium</>
                <DNSName>      .motive.com</>
                <IPAddress>         '</>
                <operatingSystem>Windows NT</>
                <osVersion>4.0</>
                <osBuildNumber>1381</>
                <osServicePack>Service Pack 3</>
                <totalMemory>64952</>
                <availableMemory>15992</>
                <swapFileSize>131912</>
                <swapFileUsage>58896</>
                <fileSystem>FAT</>
                <windowsDirectory>C:\WINNT</>
                <tempDirectory>C:\TEMP</>
                <hardDrive>
                        <driveName>C</>
                        <availableSpace>1234M</>
                        <totalSpace>1277M</>
                </>
```

TO FIG. 6B

FIG. 6B
FROM FIG. 6A

```
            </>
            <section NAME="apitest" TITLE="Map Api Test">
                <scsiAdapterInfo isInteresting="YES" isExternalReferen
ce="YES">
                            motive.mf
                    <scsiAdapter>
                            <adapter>IDE CD-ROM (ATAPI 1.2)/Dual-c
hannel PCI IDE Controller </>
                            <irq> - 14</>
                            <IoAddress> - 496</>
                            <peripherals>
                                <peripherals>
                                    <identifier>WDC AC2210
OH      10.0</>
                                    <typeDisk>Peripheral</
>
                                </>
                                <peripheral>
                                    <identifier>WDC AC3310
OH      10.0</>
                                    <type>DiskPeripheral</
>
                                </>
                            </>
                        </>
                    <scsiAdapter>
                            <adapter>IDE CD-ROM (ATAPI 1.2)/Dual-c
hannel PCI IDE Controller </>
                            <irq> - 15</>
                            <IoAddress> - 368</>
                            <peripherals>
                                <perifial>
                                    <identifier>NEC      CD
-ROM DRIVE:2823.07</>
                                    <type>CdRomPeripheral<
/>
                                </>
                            </>
                        </>
                    </>
                </>
            </>
        </>
```

METHOD, SYSTEM AND COMPUTER PROGRAM PRODUCT FOR ITERATIVE DISTRIBUTED PROBLEM SOLVING

This application is a continuation of U.S. application Ser. No. 09/073,464, filed May 6, 1998, now U.S. Pat. No. 6,145,096.

BACKGROUND OF THE INVENTION

1. Technical Field

The present invention relates generally to automated customer support and service in a distributed computing environment.

2. Description of the Related Art

Technical support services and programs are designed to diagnose and solve hardware or software problems that users and/or customers encounter as they use computers. As businesses continue to move on-line, distributed computing environments become more complex and, thus, more difficult to troubleshoot. Indeed, entire businesses now desire to connect their critical business systems directly to employees, customers, vendors and other important constituencies. To this end, many internal or external business network applications are now being connected to the Internet's World Wide Web to make the information accessible from anywhere using conventional browser software.

Traditional technical support centers place their emphasis on internal tracking and productivity tools, such as problem tracking systems. Such "back end" systems exist internally to the support organization and are usually transparent to the customer. Although back-end systems aid internal efficiency, they do little for the actual problem resolution process itself. Problem resolution is typically left to telephony-based technologies such as agent-based automatic call distribution (ACD) support centers and intelligent voice response (IVR) devices.

Such techniques attempt to diagnose and address problems on a remote node without actually having the technician travel to that node. The most common method of technical support is still a telephone conversation with tech support personnel. Other known techniques involve a network "login" to the remote node so that the conditions may be evaluated from the technical support center's viewpoint. The network connection may be used to run a diagnostic program on the remote node, or "self-help" fix-it programs may be downloaded to the remote note and executed there.

With the explosive growth of the Internet, the latter approach has been quite popular. Several companies now provide personal computer (PC) diagnostic technology in the form of diagnostic agents that run on a client machine and that perform certain low-level diagnosis and self-help for the user. Some of these products also return status information to a server, but they are primarily "client-centric" in the sense that the programs are designed to run on a user's machine in a generally autonomous manner. They implement relatively simple functionality as compared to known server-centric diagnostic tools that are generally used by developers and technicians for application debugging and problem resolution.

Thus, while it is known in the prior art to provide separate client-centric and server-centric PC diagnostic tools, the art has yet to provide an integrated approach to technical support. This problem is solved by the present invention.

BRIEF SUMMARY OF THE INVENTION

It is a primary object of this invention to provide partially or fully automated technical support in a distributed computer environment.

It is another primary object of this invention to provide real-time, interactive technical support and service to personal computer users in a distributed network.

It is still another object of this invention to automate technical support interaction processes in a distributed computer networking environment.

Still another important object of this invention is to provide a universal infrastructure for capturing, aggregating, transforming, analyzing and communicating technical support information.

It is yet another objective of this invention to combine a process of iterative refinement with a process of running remote diagnostics in a novel manner to facilitate automated technical support and service in a personal computer networking environment.

A more general object of this invention is to address and solve computer hardware and software problems typically encountered by users in a computer enterprise environment.

Yet another general object of this invention is to replace and/or augment known client-centric and server-centric technical support methods that have proven to be ineffective, costly or inefficient.

These and other objects of this invention are provided in a method, system and computer program product for automated technical support in a computer network having a client machine and at least one server. One preferred method begins by selecting a diagnostic map useful in gathering diagnostic data for evaluating a given technical problem requiring diagnosis and correction. The diagnostic map encapsulates a set of one or more methods that, upon execution, explore the client machine and gather data. The diagnostic map is then executed by a diagnostic engine to generate a data set indicative of a current operating state of the client machine. This data set is forwarded from the client machine to the server for analysis. Based on the analysis performed at the server node, the data gathering process is repeated at the client machine, iteratively, until given information is available to a user of the client machine to correct the given technical problem.

According to the invention, a given diagnostic data gathering "map" is run at the client machine to collect a data set indicative of a current operating state of a machine, a resource associated with the machine, an application or the like. A given problem solving session between a client machine and a server node (which may or may not include a human operator) involves executing a sequence of such data gathering maps in an iterative manner, directing the user towards a solution to the given technical problem. Preferably, each map encapsulates a specific set of methods and techniques used to automatically explore the computer system and to gather data.

Although a primary use of a map is to gather diagnostic data to solve user hardware and software problems, a map may be used for other purposes such as gathering asset data for inventory, gathering usage statistics for productivity reporting, and the like. Preferably, maps are infinitely variable, and any number of maps may be created and used in the automated system. Maps may be general, gathering data for a variety of uses; alternatively, a given map is very specific, gathering data for one specific purpose. According to another feature of the invention, a relatively generic set of diagnostic maps may be adapted to become "smarter" (i.e. more problem-specific) over time as more and more problems are addressed and rectified by the automated system. Thus, the "iterative refinement" technique as implemented by the automated method and system of the present invention may occur both within a current iterative problem solving session as well as over a given time period as a plurality of such sessions are carried out.

The client machine includes a diagnostic engine for executing the maps. Preferably, a single diagnostic engine is capable of running any map, and maps may be freely copied onto a machine from the network, from disk storage media, from e-mail attachments, and the like. According to a feature of the invention, the "client" piece of the invention may be implemented in a computer program product in a computer-readable medium. The product is executable in the client machine and includes a number of components or elements. In particular, the product includes a set of one or more diagnostic maps, each of which encapsulates a set of one or more methods that, upon execution, are capable of exploring the client machine and gathering data. The computer program product also includes program instruction means responsive to occurrence of a given technical problem requiring diagnosis and correction for initiating an iterative problem solving session using the set of one or more diagnostic maps. In addition, the computer program product includes means operative during the iterative problem solving session for iteratively executing the set of one or more diagnostic maps to generate one or more respective data sets useful in identifying and rectifying the given technical problem.

The server piece of the invention preferably executes in a diagnostic center located remotely from the node under test on which the client piece executes. The server functionality may also be implemented as a computer program, e.g., a program instruction means operative at the server node during the iterative problem solving session for evaluating the one or more respective data sets and in response thereto generating information for use in correcting the given technical problem. In particular, the information may include instructions for refining a given diagnostic map, running a new (but existing) diagnostic map, writing and running a completely new diagnostic map, or the like. The information may also comprise instructions on how to "fix" or otherwise address the technical problem.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a block diagram of a representative Web client and server network environment in which the present invention may be implemented;

FIG. 2 is a simplified block diagram illustrating how a remote node under test interfaces to a diagnostic center operating at a server node during the iterative problem solving session according to the present invention;

FIG. 3 is a more detailed block diagram of the diagnostic center of the present invention implemented in an intranet;

FIG. 6 is a representative data set compiled in response to execution of a diagnostic map by a diagnostic engine.

DETAILED DESCRIPTION OF THE PREFERRED EMBODIMENT

Figure 4:
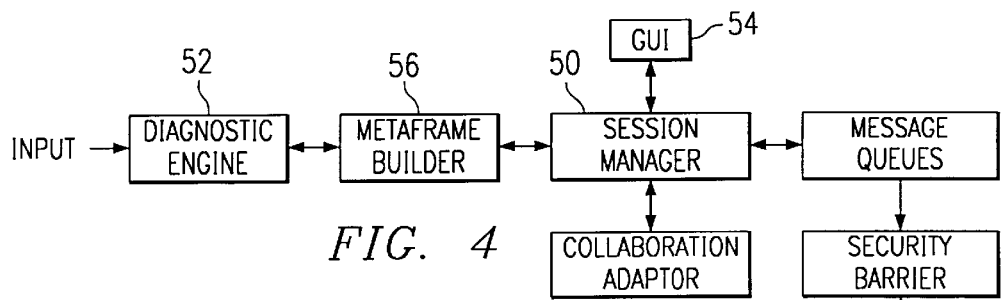
FIG. 4 is a block diagram of the client components of the invention implemented on a remote node.

The present invention is implemented conveniently in an Internet or Web-based computer network, although this is not a requirement. Thus, by way of background, a representative Web client/Web server is illustrated in FIG. 1. In particular, a client machine 10 is connected to a Web server platform 12 via a communication channel 14.

For illustrative purposes, channel 14 is the public Internet, an intranet, an extranet or any other known network connection. Web server platform 12 is one of a plurality of servers which are accessible by clients, one of which is illustrated by machine 10. A representative client machine may include a Web browser 16, which is a known software tool used to access the servers of the network. The Web server platform supports files in the form of hypertext documents, graphics and other data type objects. The network path to a server (or to a file on the server) is identified by a Uniform Resource Locator (URL), as is well-known.

A representative Web Server platform 12 comprises a Compaq® computer 18 running the NT Operating System 20 and a Web server program 22, such as Netscape Enterprise Server Version 3.51, that supports interface extensions. The platform 12 also includes a graphical user interface (GUI) 24 for management and administration, and an Application Programming Interface (API) 23 to enable application developers to extend and/or customize the core functionality thereof through software programs known as "plug-ins."

A representative Web client is a personal computer that is x86-, PowerPC®- or RISC-based, includes an operating system such as Microsoft Windows '95 or NT, as well as a browser, such as Netscape Communicator (any version) or Internet Explorer (any version), having native support for application plug-ins. The Web client machine is connectable to the Web server(s) via the Internet, an intranet or some other computer network. The Web client browser typically includes a Java Virtual Machine (JVM), which provides a convenient runtime environment for programs written as Java applications or applets.

Although not required, the present invention is preferably implemented as a Java application or applet (i.e. a set of Java program instructions or code) that is downloaded to or otherwise delivered to a machine (on a tangible medium) and installed in a known manner.

Although the Web client is typically a personal computer, this is not a requirement. The Web client may be any generalized "information appliance" having a processor, an operating system, optionally a browser application, and a means to connect the device to a computer network from which data may be retrieved. Such appliances include, without limitation, a handheld or palmtop device (e.g., running Windows CE 2.0 or higher), a diskless or so-called "network computer", a set-top computer terminal, or the like.

Generalizing, and with reference to FIG. 2, the automated diagnostic method of the present invention may be implemented in any remote distributed node "under test" 30 connectable to a diagnosis center operating at a server node 32. A problem at the remote distributed node is diagnosed (and preferably rectified) according to the invention using an "iterative problem solving session" between the remote distributed node 30 and the server node 32. An iterative problem solving session refers to set of communications back and forth between the node under test and the diagnostic center by which a solution to a technical problem is reached. A session may involve only one "pass" or iteration although, more typically, several iterations will be required to move toward a corrective action to be implemented at the client node. Because of its iterative nature, the final success of the diagnostic session is not dependent on selection of a first map. Rather, a poor first choice merely adds cycles to the session.

Although numerous system architectures may be used to implement the inventive technique, one particularly advantageous architecture is illustrated in FIG. 3. This architecture is implemented, for example, in a corporate enterprise environment (such as an intranet), wherein a plurality of client machines (desktops) 34 interface with a support center 35 located at a server node through a network 35. The clients are the desktop machines used by the community of application end users; these are the people who use applications, encounter problems, and seek help. Typically, client machines 34 are separated from the network 36 via a firewall 37. Each client machine may include conventional browser software. The server node may have associated therewith a set of one or more support engineer (SE) desktops 38 at which technical support personnel reside. Under certain circumstances as will be described, a user of a given client machine may be placed in contact (e.g., via a voice connection over the telephone, through an on-line Web connection, or the like) with a given technical support engineer. Typically, however, technical support and service is provided in an automated manner, without necessarily connecting the user/customer to a support engineer via an audio or on-line link. That is not to say that a given SE does not interact with a user during a session, however, as such interaction may occur without the user's actual knowledge or without any direct communication.

The diagnostic center 35 comprises a number of functional components that are now described. The center includes one or more routing servers 40, and each routing server's primary responsibility is to route a given data set to a best-equipped support engineer to handle the call. To this end, information in the data set is matched up against help desk "rules" to determine which group or person should handle the problem. Preferably, the routing server 40 attempts to assign data sets to a most appropriate message queue 42 (and thus, indirectly, to a most appropriate support engineer). Given support engineers belong to a set of "groups", each having an associated message queue 42 of assigned data sets. A given support engineer obtains ownership of a given data set from his or her respective queue until the session is complete or the call is reassigned to some other group. A work queue manager 44 is responsible for managing the message queues 42.

In addition to performing routing, communications, and data packaging services, the diagnostic center also supports the server portion of the inventive automated support application. The server portion comprises a database server (e.g., a commercially available relational database management system (RDBMS)) 46 and an application server 48. A representative RDBMS is available from Oracle, Microsoft or others. The application server 48 provides a set of services to keep the support engineer desktops up-to-date as well as to provide general services to the application back-end.

Thus, the diagnostic center routes incoming calls to the best call group queue, provides services to the SE desktops, provides services to the support center management console 49, and interfaces to third party products/systems that store configuration data and track results. The management console is a mission control for support center activities. Preferably, the console 49 has both data display and system configuration capabilities. The data displays are both realtime and historic views into the call center metrics, and the configuration dialogs are used to set operational characteristics of the server. A convenient browser-based or other user interface may be used for this purpose.

A block diagram of the "client" piece of the present invention is illustrated in FIG. 4. The client piece executes on the machine under test (i.e. the machine on which the technical problem has arisen) to perform an initial diagnosis in response to a given occurrence (e.g., a PANIC), to submit the diagnosis to the diagnostic center, and to collaborate with the server components in the center to perform further tests in an iterative manner, and, if possible, to make repairs. The major client components includes a session manager 50, a diagnostic engine 52 and a graphical user interface (GUI) 54. The session manager 50 takes the initial diagnosis (using a diagnostic map), submits it to the server, tracks open problems, and coordinates the flow of information between the client and the support center. The diagnostic engine is a core piece of code that diagnoses problems and collects data as defined by the diagnostic map(s). It cooperates with a data set builder 56 to create data sets, and it works together with the session manager 50 to forward such data sets to the diagnostic center. The client side GUI 54 may be a simple display icon on the user's desktop that is activated when required (e.g., during a PANIC). The client GUI 54 may also be used to provide dialog boxes or the like to enable the user to monitor and/or interact during a connection with a SE.

in the system illustrated in FIGS. 3–4, all communications are made conveniently over TCP networks, but are not dependent on persistent TCP connections. Instead, a single logical session may span multiple TCP connections. A communications subsystem interfaces the client and diagnostic center, managing the input and output queues, and providing basic network location services. In addition, th e system may include a security subsystem as network communications should be secure. Thus, for example, a given data set is preferably sealed to restrict access to the data to those having proper credentials. All operations performed on the client machine preferably must first pass security conditions to ensure that only support engineers authorized by the client may inspect of change e the client.

Figure 5:
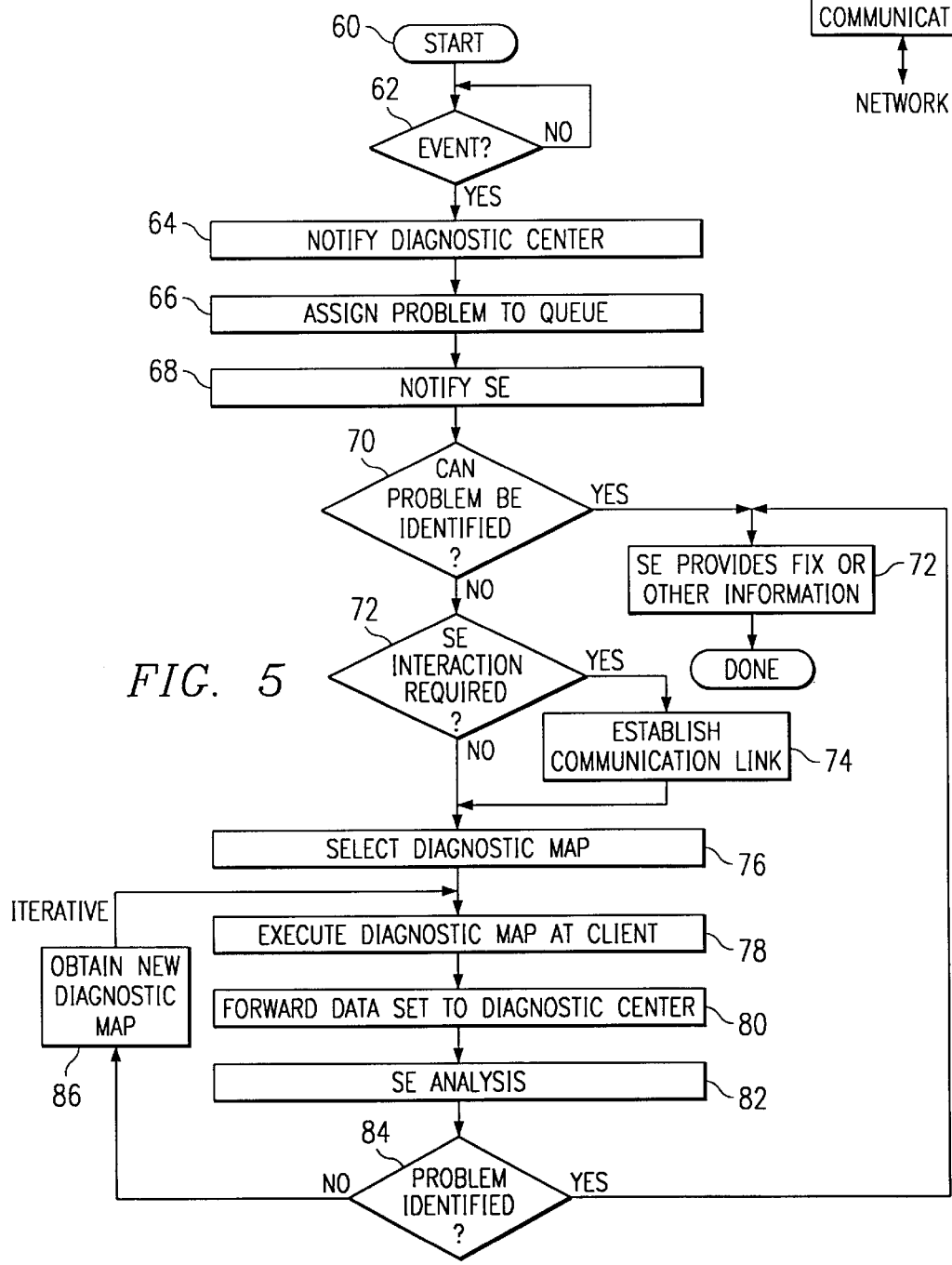
FIG. 5 is a flowchart illustrating a preferred method of automated technical support according to the present invention.

A simplified flowchart showing how the inventive technique is u used is illustrated in FIG. 5. Sever al of the steps described and illustrated are provided by way of background or context and should not be taken to limit the invention. The routine begins at step 60. At step 62, a test is run to determine whether a given event requiring diagnosis has occurred. If not, the routine merely cycles. If, however, the outcome of the test at step 62 is positive (e.g., due to a PANIC), the routine continues at step 64 to notify the diagnostic center. At step 66, the problem is assigned to a particular queue. The SE obtains the notice at step 68 (e.g., either by notifying the SE of a new event or by having the SE browse his/her queue and pull the notice). At step 70, a test is performed to determine whether the problem can be identified. If so, the routine branches to step 72 with the SE providing a fix or other given information. An example of such other information may be a URL at which resolution information can be fetched.

If the outcome of the test at step 70 is negative, it is assumed that the problem cannot be identified. This is the situation at which the iterative process of the present invention is implemented. At step 72, a test is optionally performed to determine whether interaction between the user (at the client machine) and the SE is required. If so, the routine branches to step 74 to establish an appropriate communication link (e.g., text-based interactive chat, dialup telephone call, video conference call, or the like).

The routine then continues at step 76 with the selection of a given diagnostic map. The selection process may be automated, or it may be initiated by the SE. A particular implementation may involve the SE performing a drag-and-drop operation on an SE desktop GUI, which then launches the selected map to the client workstation. Or, the SE may send control information instructing the diagnostic engine at the client machine to run a particular diagnostic map that has been stored in the client machine in an prior process. Or, the selection may take place automatically using a default diagnostic map.

At step 78, the diagnostic map is executed by the diagnostic engine to generate a "data set" indicative of a current operating state of the client machine, a resource running on the client machine, a software application or the like. The data set is then forwarded to the diagnostic center at step 80. At step 82, the SE performs an analysis of the data. The routine then continues at step 84 by testing to determine whether the problem can be identified based on the information provided. If so, the routine branches back up to step 72 with the fix (or other information) then provided to the user. If, however, the result of the test at step 84 is negative, the routine then continues by obtaining a new diagnostic map at step 86 and returning to step 78. The new diagnostic map may be a newly-written map. It may be an existing map that has yet to be executed. Or, it may be a revised version of a map that has already been executed. The new diagnostic map may be a previously-executed map being run a second time.

The process repeats, iteratively, until given information is available to a user of the client machine to correct the given technical problem. The fix may be performed by the user, or by the SE, by cooperation between the user and the SE, or by some third party. The particular techniques by which problem fixes are carried out are beyond the scope of the present invention.

As data sets are provided to the diagnostic center, they are stored in the RDBMS to enlarge the "knowledge base" stored therein. In this manner, specific problems may be useful in generating new diagnostic maps that are then delivered or deliverable to the client machines as the system "grows" in expertise. As noted above, the selection of the first map to run in response to occurrence of a technical problem can also be either by human intervention or by some automated means. Thus, as has been described, a human may initiate a trouble-shooting session by launching the trouble-shooting application. Then, the application attempts to pick a diagnostic map specific to the likely problem encountered by the user. An interesting characteristic of the iterative approach is that the final success is not dependent on the selection of the first map. A poor first choice will only add cycles to the iteration. A subsequent map can take a completely divergent path from the initial map. Each run of a map then produces diagnostic output in the form of the data set.

The data set is submitted to the diagnosis center where it is analyzed. In many cases, the diagnosis center is a separate node in the distributed network, but it may be the same node as the node where the problem occurred. The data set is then analyzed at the diagnosis center. The result of the analysis may be that the problem can be solved without additional iterative execution of additional diagnostic maps. Thus, as has been described, it may be necessary to undertake an iterative session by running a new map or refining and rerunning the current map. The analysis at the diagnostic center can be done by either a human or by an automated system.

It is often the case that the first few iterations of the process are rote enough that they are easily handled automatically. If necessary, the process may then switch to a human analysis once the data set becomes more complex. In either case, the analysis of the data set may determine that the problem lies elsewhere, in which case a new map can be run to collect a completely new data set. The analysis may show that the correct map was run, but that the map failed to specify the collection of some crucial data. In this case, the existing map can be refined to encompass the new data. This refinement benefits the current trouble shooting session, but more importantly is a mechanism by which maps become "smarter" over time. A relatively generic set of diagnostic maps will grow to be very problem specific. As has also been described, the diagnostic maps can be either already present on the remote machine or can be sent across the network as needed.

Security must be considered when gathering data, especially when that data will be copied off the source machine. Certain portions of a local machine may be "off limits" to data gathering, or only certain types of information should be gatherable. Infinitely variable maps present a problem to security because the set of all possible actions cannot be determined ahead of time. Operating system hooks are used to monitor all access to the local machine by the map engine. A selective filter allows sanctioned operations to proceed (e.g. reading files), but blocks unsanctioned operations (e.g. writing to a specific directory).

A representative data set is illustrated in FIG. 6. The data set file syntax is conveniently formatted according to Extensible Markup Language (XML), which is an emerging standard.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "We server" should also be broadly construed to mean a computer, computer platform, an adjunct to a computer or platform, or any component thereof. Of course, a "client" should be broadly construed to mean one who requests or gets the file, and "server is the entity which provides the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

In accordance with 37 CFR §1.121(b)(1)(iii), Appendix B contains marked up versions of the amended paragraphs illustrating the newly introduced changes in the specification.

What is claimed is:

1. A method for automated technical support over the internet between a client machine and at least one server located remotely from the client machine, comprising:

generating a notification of a failure at the client machine;

receiving at the server the notification of the failure from the client machine;

identifying the failure at the server;

identifying data for resolution of the failure at the server;

forwarding the data for resolution to the client machine;

if the failure cannot be identified, determining if an interaction with a service technician is required; and if the interaction with the service technician is required, establishing a connection between a user of the client machine and the service technician; and if the interaction with the service technician is not required, collecting a plurality of data sets from the client machine, and analyzing the plurality of data sets at the server to identify the failure, wherein the collecting the plurality of data sets further comprises generating a diagnostic map at the server, executing the diagnostic map at the client machine to generate one of the data sets, forwarding the data set from the client machine to the server for analysis, if the failure is not identified, generating a refined version of prior diagnostic map, and iteratively repeating steps of generating the diagnostic map, executing, forwarding and generating the refined version of prior diagnostic map until the failure is identified.

2. The method of claim 1, further comprising:

storing the plurality of data sets received from the client machines in a repository at the server;

using the plurality of data sets stored in the repository at the server to generate the refined diagnostic map;

storing the refined diagnostic map in the repository; and using information in the repository to resolve other failures.

3. A method for automated technical support in a computer network having a plurality of client machines and at least one server node, comprising:

generating a notification of a failure at the client machine;

receiving at the server node the notification of the failure from one of the client machines;

identifying the failure at the server node;

identifying data for resolution of the failure at the server node;

forwarding the data for resolution to the client machine;

if the failure cannot be identified, determining if an interaction with a service technician is required, if the interaction with the service technician is required, establishing a connection between a user of the client machine and the service technician, if the interaction with the service technician is not required, collecting a plurality of data sets from the client machine, and analyzing the plurality of data sets at the server node to identify the failure, wherein the collecting the plurality of data sets further comprises generating a diagnostic map at the server node, executing the diagnostic map at the client machine to generate one of the data sets, forwarding the data set from the client machine to the server node for analysis, if the failure is not identified, generating a refined version of prior diagnostic map, and iteratively repeating steps of generating the diagnostic map, executing, forwarding and generating the refined version of prior diagnostic map until the failure is identified.

4. The method of claim 3, further comprising:

storing the plurality of data sets received from the client machines in a repository at the server node;

using the plurality of data sets stored in the repository at the server node to generate the refined diagnostic map;

storing the refined diagnostic map in the repository at the server node; and using information in the repository at the server node to resolve other failures.

5. A computer program product encoded in computer readable media for automated technical support in a networking environment between a client machine and a least one server located remotely from the client machine, the computer program product comprising a set of instructions to:

generate a notification of a failure at the client machine;

receive at the server the notification of the failure from the client machine;

identify the failure at the server;

identify data for resolution of the failure at the server;

forward the data for resolution to the client machine;

if the failure cannot be identified, determine if an interaction with a service technician is required, if the interaction with the service technician is required, establish a connection between a user of the client machine and the service technician, if the interaction with the service technician is not required, collect a plurality of data sets from the client machine, and analyze the plurality of data sets at the server to identify the failure, wherein the set of instructions configured to collect the plurality of data sets is further configured to generate a diagnostic map at the server, execute the diagnostic map at the client machine to generate one of the data sets, forward the data set to the server for analysis, if the failure is not identified, generating a refined version of prior diagnostic map, and iteratively repeating steps of generating the diagnostic map, executing, forwarding and generating the refined version of prior diagnostic map until the failure is identified.

6. The computer program product of claim 5, wherein the set of instructions is further configured to store the plurality of data sets received from the client machines in a repository at the server;

use the plurality of data sets stored in the repository at the server to generate the refined diagnostic map;

store the refined diagnostic map in the repository; and use information in the repository to resolve other failures.

7. The computer program product of claim 5, wherein the diagnostic map is executable in a networking environment at the client machine.

8. The computer program product of claim 5, wherein the set of instructions is further configured to
generate the notification of the failure upon happening of a predetermined event at the client machine.

9. A system for automated technical support in a networking environment between a client machine and at least one server located remotely from the client machine, comprising:
a monitoring engine executable in a networking environment at the client machine, the monitoring engine configured to
monitor operating states of the client machine,
generate a notification of a failure at the client machine, and
forward the notification of the failure to the server;
a diagnostic engine executable at the server configured to
receive the notification of the failure from the client machine,
identify the failure,
identify data for resolution of the failure, and
forward the data for resolution to the client machine;
if the failure cannot be identified,
determine if an interaction with a service technician is required,
if the interaction with the service technician is required,
establish a connection between a user of the client machine and the service technician, and
if the interaction with the service technician is not required,
collect a plurality of data sets from the client machine,
analyze the plurality of data sets at the server to identify the failure,
generate a diagnostic map,
forward the diagnostic map to the monitoring engine at the client machine to execute the diagnostic map at the client machine to generate one of the data sets,
receive the data set from the monitoring engine at the client machine for analysis, and
if the failure is not identified during the analysis,
generate a refined version of prior diagnostic map, and
iteratively repeat steps of generating the diagnostic map, executing, forwarding and generating the refined version of prior diagnostic map until the failure is identified.

10. The system of claim 9, wherein the diagnostic engine is further configured to
store the plurality of data sets received from the client machines in a repository at the server;
use the plurality of data sets stored in the repository at the server to generate the refined diagnostic map;
store the refined diagnostic map in the repository; and
use information in the repository to resolve other failures.

11. An automated technical support system for a computer network having a client machine connectable over internet to a server comprising:
means for generating a notification of a failure at the client machine;
means for receiving at the server the notification of the failure from the client machine;
means for identifying the failure at the server;
means for identifying data for resolution of the failure at the server; and
means for forwarding the data for resolution to the client machine;
means for determining if an interaction with a service technician is required when the failure cannot be identified;
means for establishing a connection between a user of the client machine and the service technician if the interaction with the service technician is required;
means for collecting a plurality of data sets from the client machine when the interaction with the service technician is not required; and
means for analyzing the plurality of data sets at the server to identify the failure,
wherein the means for collecting the plurality of data sets further comprises
means for generating a diagnostic map at the server,
means for executing the diagnostic map at the client machine to generate one of the data sets,
means for forwarding the data set from the client machine to the server for analysis,
means for generating a refined version of prior diagnostic map if the failure not identified, and
means for iteratively repeating steps of generating the diagnostic map, executing, forwarding and generating the refined version of prior diagnostic map until the failure is identified.

12. The system of claim 11, further comprising:
means for storing the plurality of data sets received from the client machines in a repository at the server;
means for using the plurality of data sets stored in the repository at the server to generate the refined diagnostic map;
means for storing the refined diagnostic map in the repository; and
means for using information in the repository to resolve other failures.

13. A monitoring engine for a system for automated technical support in a networking environment between a client machine and at least one server located remotely from the client machine, the monitoring engine executable in a networking environment at the client machine, comprising:
means for monitoring operating states of the client machine,
means for generating a notification of a failure at the client machine, and
means for forwarding the notification of the failure to the server;
when an interaction with a service technician is required,
means for responding to a request for a connection between a user of the client machine and the service technician, and
means for establishing the connection at the client machine between the user of the client machine and the service technician;
when the interaction with the service technician is not required,
means for collecting a plurality of data sets from the client machine, and
means for forwarding the plurality of data sets to the server to identify the failure,
means for receiving a diagnostic map from the server,
means for executing the diagnostic map at the client machine to generate one of the data sets,
means for forwarding the data set to the server for analysis, and when the failure is not identified by the server during the analysis,
   means for receiving a refined version of prior diagnostic map, and
   means for iteratively repeating steps of receiving the diagnostic map, executing, forwarding and receiving the refined version of prior diagnostic map until the failure is identified.

14. The system of claim 13, wherein the plurality of data set represent a plurality of operating states of the client machines;

the diagnostic map comprises a plurality of methods to generate the data set at the client machine; and the diagnostic map is customized to the failure.

15. A diagnostic engine for a system for automated technical support in a networking environment between a client machine with a monitoring engine executable in the networking environment and at least one server located remotely from the client machine, the diagnostic engine comprises:

means for receiving a notification of a failure from the client machine, means for identifying the failure, means for identifying data for resolution of the failure, and means for forwarding the data for resolution to the client machine;

when the failure cannot be identified,
   means for determining whether an interaction with a service technician is required,
when the interaction with the service technician is required,
   means for establishing a connection between a user of the client machine and the service technician,
when the interaction with the service technician is not required,
   means for collecting a plurality of data sets from the client machine,
   means for analyzing the plurality of data sets at the server to identify the failure,
   means for generating a diagnostic map,
   means for forwarding the diagnostic map to the client machine to execute the diagnostic map at the client machine to generate one of the data sets,
   means for receiving the data set from the client machine for analysis, and
when the failure is not identified during the analysis,
   means for generating a refined version of prior diagnostic map, and
   means for iteratively repeating steps of generating the diagnostic map, forwarding, receiving and generating the refined version of prior diagnostic map until the failure is identified.

16. The diagnostic engine of claim 15, further comprising:

means for storing the plurality of data sets received from the client machines in a repository at the server;

means for using the plurality of data sets stored in the repository at the server to generate the refined diagnostic map;

means for storing the refined diagnostic map in the repository; and means for using information in the repository to resolve other failures.

* * * * *